(12) United States Patent
Tanase (10) Patent No.: US 11,962,145 B2
(45) Date of Patent: Apr. 16, 2024

(54) HIGH-VOLTAGE, BIDIRECTIONAL PROTECTION CIRCUITS AND METHODS

(71) Applicant: Maxim Integrated Products, Inc., San Jose, CA (US)

(72) Inventor: Gabriel Eugen Tanase, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/744,290

(22) Filed: May 13, 2022

(65) Prior Publication Data

US 2022/0393463 A1 Dec. 8, 2022

Related U.S. Application Data

(60) Provisional application No. 63/197,449, filed on Jun. 6, 2021.

(51) Int. Cl.
*H02H 9/04* (2006.01)
*G01D 3/08* (2006.01)

(52) U.S. Cl.
CPC ............... *H02H 9/048* (2013.01); *G01D 3/08* (2013.01)

(58) Field of Classification Search
CPC ................................. H02H 9/048; G01D 3/08
See application file for complete search history.

(56) References Cited

U.S. PATENT DOCUMENTS

| 9,130,383 | B2 * | 9/2015 | Mukai ................. H02J 7/0048 |
| 9,871,373 | B2 | 1/2018 | O'Donnell et al. |
| 2014/0111113 | A1 * | 4/2014 | Del Carmen, Jr. .. H05B 45/375 363/78 |

FOREIGN PATENT DOCUMENTS

DE 10007607 B4 7/2006

* cited by examiner

*Primary Examiner* — Scott Bauer
(74) *Attorney, Agent, or Firm* — North Weber & Baugh LLP; Michael North (57) ABSTRACT

Systems and methods herein use a sensing circuit to detect an overvoltage at a voltage node as a drain current. A current-mode comparator converts the detected current into a control signal, which is provided to a control circuit. The control circuit uses the control signal cut of a bias current to turn off switches in a protection circuit to create a high-impedance electrical path between the voltage node and the to-be-protected voltage node.

20 Claims, 5 Drawing Sheets

HIGH-VOLTAGE, BIDIRECTIONAL PROTECTION CIRCUITS AND METHODS

CROSS REFERENCE TO RELATED PATENT APPLICATIONS

The present application claims priority benefit, under 35 U.S.C. § 119(e), to and commonly-assigned U.S. Provisional Patent Application No. 63/197,449, filed on Jun. 6, 2021, entitled "High-Voltage, Bidirectional Protection Circuits and Methods," listing Gabriel Eugen Tanase as inventor, which application is herein incorporated by reference as to its entire content. Each reference mentioned in this patent document is incorporated by reference herein in its entirety.

BACKGROUND

A. Technical Field

The present disclosure relates generally to systems and methods to protect electrical circuit components against failures or physical damage resulting from overvoltage conditions. More particularly, the present disclosure relates to active circuits and methods that detect, monitor, and protect against overvoltage conditions.

B. Background

Low-voltage electronic circuit components oftentimes need to be protected against excessive high voltages that may lead to component failures and under certain circumstances even to physical destruction. While some existing designs limit the maximum available voltage to acceptable levels, this is not always a practical or even possible approach, depending on the particular application. Accordingly, what is needed are systems and methods that allow safe operation of low-voltage circuit components in the event of unwanted exposure to high voltages.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, it shall be noted that although embodiments described herein are given in the context of overvoltage protection as a measure against high voltages, one skilled in the art will recognize that the teachings of the present disclosure are not limited only to overvoltage protection applications and may equally be used in other contexts, including overcurrent protection.

In this document, the term "circuit" and "sub-circuit" are used interchangeably. "High voltage" refers to a voltage that is greater than an operating voltage of a to-be-protected circuit, e.g., the supply voltage of a sub-circuit. Exemplary high voltages may be in the hundreds or thousands of Volts. Further, the term "switch" refers to any type of switch known in the art, including transistors, thyristors, etc., both for analog and digital circuits.

Figure 1:
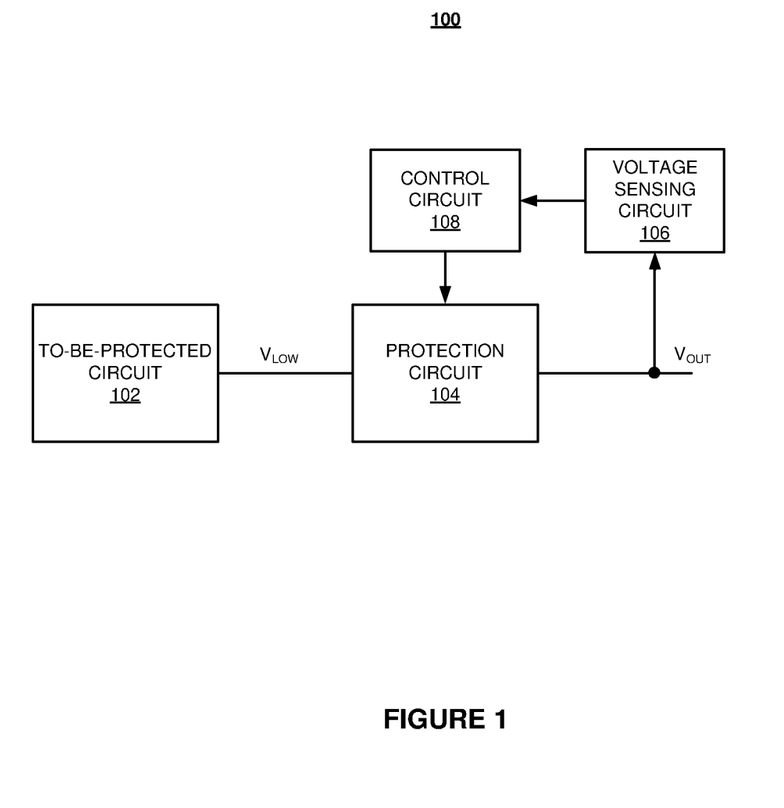
FIG. 1 is a simplified block diagram of a protection circuit according to various embodiments of the present disclosure.

FIG. 1 is a simplified block diagram of a protection circuit according to various embodiments of the present disclosure. Circuit 100 comprises to-be protected circuit 102, protection circuit 104, voltage sensing circuit 106, and control circuit 108. To-be protected circuit 102 may be any low-voltage circuit that is to be protected from an overcurrent or overvoltage condition at a certain node, denoted as $V_{LOW}$ in FIG. 1. Protection circuit 104 may be any network that can assume a high impedance and, thereby, shield to-be protected circuit 102 from, e.g., a high voltage that may be present at a voltage node, denoted as $V_{OUT}$, e.g., an output voltage node of circuit 100. In embodiments, protection circuit 104 may be implemented as a switching network, as discussed in greater detail with reference to FIG. 4 below. Voltage sensing circuit 106 may be any circuit that can detect a voltage at node $V_{OUT}$, e.g., by using voltage or current sensing circuitry. Control circuit 108 may comprise circuitry to control protection circuit 104.

In operation, in response to voltage sensing circuit 106 detecting a relatively high voltage at node $V_{OUT}$, by using any voltage or current sense method known in the art, voltage sensing circuit 106 may communicate the presence of a high voltage directly or indirectly to control circuit 108. In embodiments, control circuit 108 may then control protection circuit 104, e.g., by enabling a mode of operation that prevents the high voltage at node $V_{OUT}$ from negatively impacting to-be protected circuit 102.

For example, in a normal mode of operation, the voltage at node $V_{OUT}$ may remain within a range between a reference potential (e.g., a ground potential) and a maximum voltage at node $V_{LOW}$. In embodiments, $V_{LOW}$ may be a supply voltage that drives to-be protected circuit 102. In such normal or regular mode, voltage sensing circuit 106 may actively or passively direct control circuit 108 to not activate a protection mechanism.

Conversely, in a protection mode of operation, when the voltage at node $V_{OUT}$ exceeds the normal range, i.e., when $V_{OUT}$ exceeds the voltage at node $V_{LOW}$, voltage sensing circuit 106 may control circuit 108 to activate a protection mechanism, e.g., by generating and driving a current that is indicative of an overvoltage condition into control circuit 108.

In embodiments, voltage sensing circuit 106 may generate a low or high signal indicating the presence of an overvoltage condition at output node $V_{OUT}$. In response, control circuit 108 may activate one or more components in protection circuit 104 to generate a high impedance between to-be protected circuit 102 and potentially damaging high voltage $V_{OUT}$. In embodiments, control circuit 108 may accomplish this by activating a switching network that may be located within protection circuit 104.

It is noted that, in embodiments, protection circuit 100 may be implemented as a symmetric or pseudo-symmetric circuit that is configured to protect to-be protected circuit 102 against both positive high voltages that may exist at node $V_{OUT}$ as well as against negative high voltages, hereinafter denoted as +HV and −HV, respectively.

Figure 2:
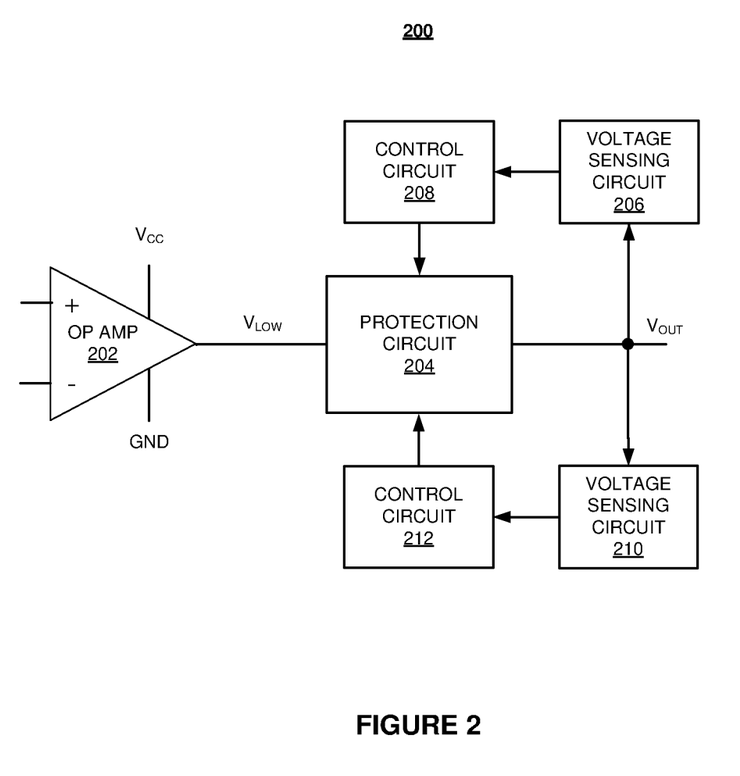
FIG. 2 is a simplified block diagram of an exemplary symmetric protection circuit block diagram according to various embodiments of the present disclosure.

FIG. 2 is a simplified block diagram of an exemplary symmetric protection circuit block diagram according to various embodiments of the present disclosure. Components similar to those shown in FIG. 1 are labeled in the same manner. For purposes of brevity, a description or their function is not repeated here. In embodiments, voltage sensing circuit 206 may be used to detect a positive high voltage +HV at voltage node $V_{OUT}$, and voltage sensing circuit 210 may be used to detect a negative high voltage −HV. In this way, bidirectional high-voltage protection may be achieved.

In embodiments, control circuits 206 and 208 may be implemented as gate control circuits. For example, control circuit 206 may control the gate of a set of N-type MOSFET (metal-oxide-semiconductor field-effect transistor) devices and control circuit 208 may control the gate of a set of P-type MOSFET devices.

In embodiments, a to-be protected circuit may comprise sensitive electronic circuitry, such as operational amplifier 202, that may have $V_{CC}$ as supply voltage. It is noted that voltage node $V_{OUT}$ may be coupled to any type of external load (not shown).

A person of skill in the art will appreciate that each circuit may be implemented using various analog and digital circuit components. Such person will further appreciate that any auxiliary components and circuitry, such as power supplies, logic gates, operational amplifiers, control logic, etc., may be used to accomplish the objectives of the present disclosure.

Figure 3:
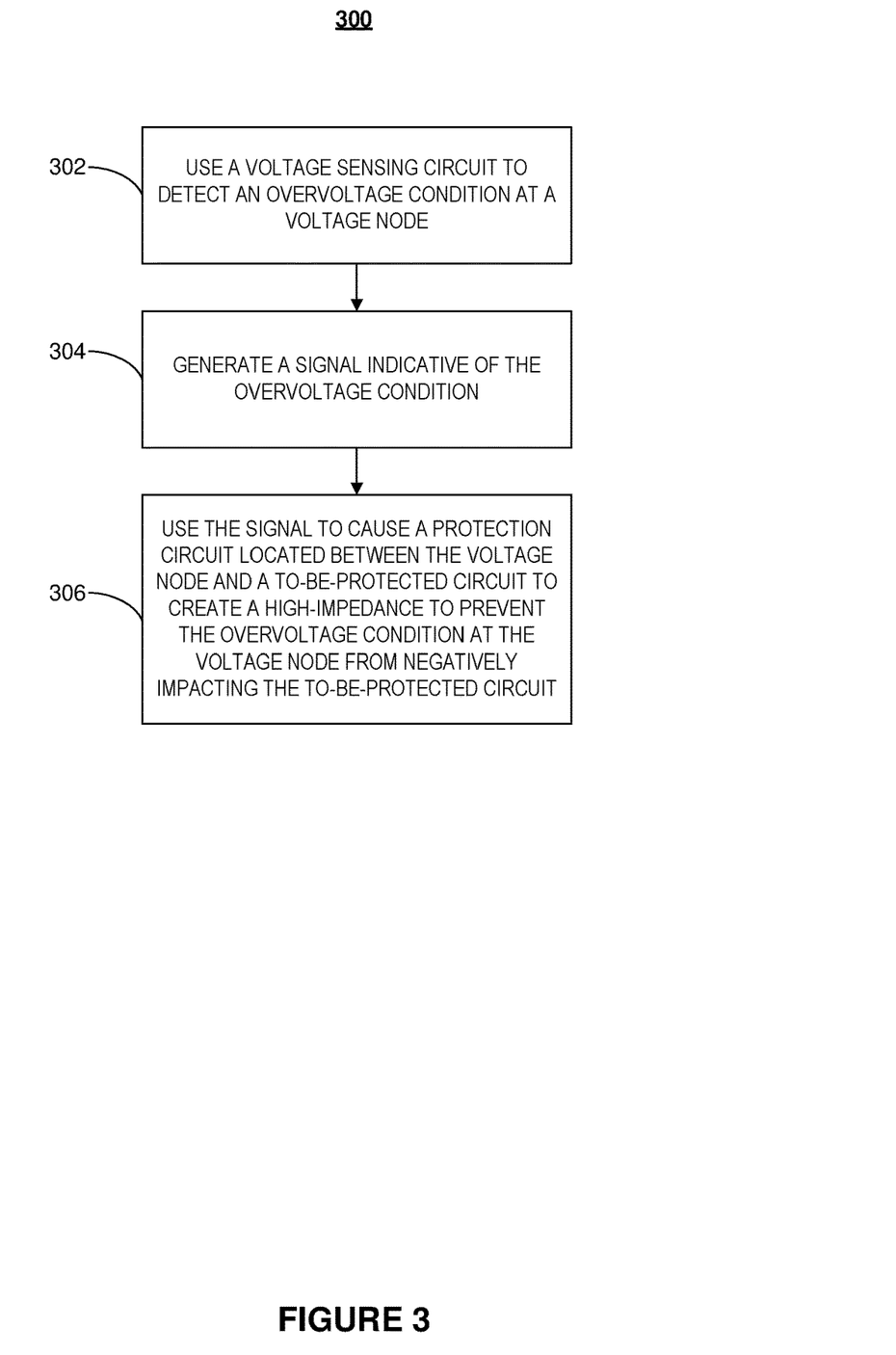
FIG. 3 is a flowchart of an illustrative process for protecting circuit components against overvoltage conditions in accordance with various embodiments of the present disclosure.

FIG. 3 is a flowchart of an illustrative process for protecting circuit components against overvoltage conditions in accordance with various embodiments of the present disclosure. In embodiments, process 300 may begin when, at step 302, a voltage sensing circuit detects an overvoltage condition at a voltage node. At step 304, the voltage sensing circuit may generate a signal indicative of the overvoltage condition that, at step 306, may be used, e.g., by a control circuit to control (e.g., activate) a protection circuit that is coupled to and protects a to-be-protected circuit. In embodiments, the protection circuit may create a high-impedance path between the to-be-protected circuit and the voltage node such as to prevent the overvoltage condition at the voltage node from negatively impacting the to-be-protected circuit.

One skilled in the art shall recognize that herein: (1) certain steps may optionally be performed; (2) steps may not be limited to the specific order set forth herein; (3) certain steps may be performed in different orders; and (4) certain steps may be done concurrently.

Figure 4:
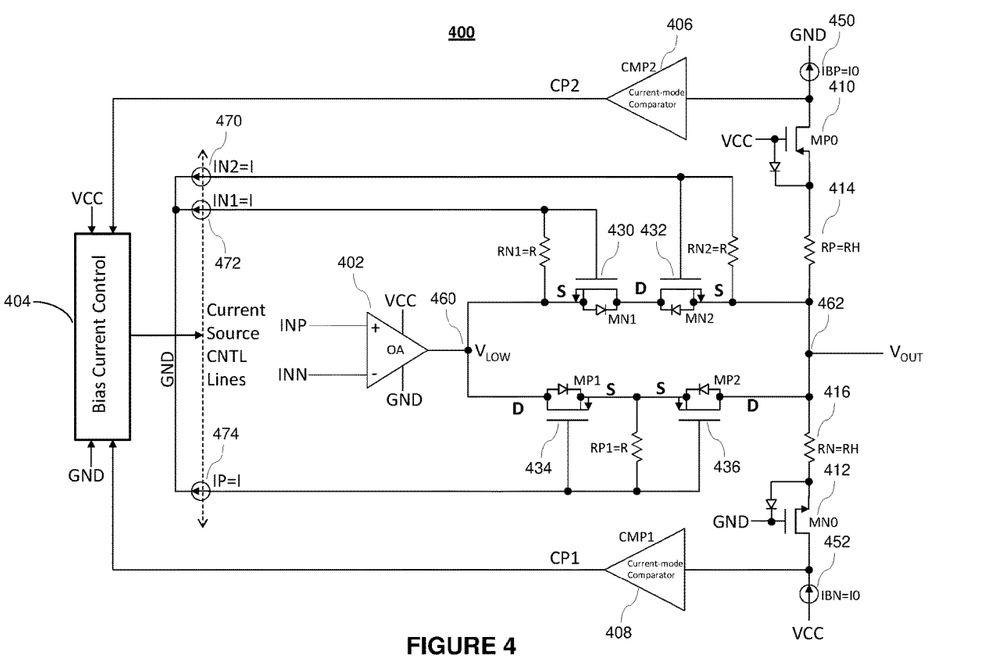
FIG. 4 is a schematic of an exemplary bidirectional high-voltage protection circuit according to various embodiments of the present disclosure.

FIG. 4 is a schematic of an exemplary bidirectional high-voltage protection circuit according to various embodiments of the present disclosure. Circuit 400 comprises operational amplifier 402, to-be-protected voltage node 460, bias current control circuit 404, current mode comparators 406, 408, sensing circuit switches 410-412, high-voltage resistors 414-416, low-voltage resistors 420-424, switches 430-436, current sources 450-458 and 470-474, and output voltage node 462.

Arrows on switches 430-432 indicate source terminals, and the midpoint between switches 430-432 indicates the location of drain terminals. It is noted that although switches 430-432 are depicted as normally closed N-type MOSFET devices having body diodes, it is understood that other controlled devices, e.g., devices that have no body diode or have other dopings, structures, and control mechanism may be used. For example, the body diodes shown in FIG. 4 and their functions may be implemented by using components that may be located external to switches, such as relays, etc.

In embodiments, during normal operation, voltage $V_{OUT}$ at output voltage node 462 may be within a range VCC to GND. In such case, switches 410 and 412 assume a substantially zero drain current. As a result, current mode comparators 406 and 408 may produce respective "low" level signals, denoted as CP1 and CP2 in FIG. 4. In embodiments, signals CP1 and CP2 may be used to control the status of bias current sources 470-474 to be active. Bias currents, denoted as IP, IN1, and IN2 flow through respective resistors, denoted as RP1, RN1, and RN2, and develop corresponding voltage drops.

Since, by virtue of being coupled in a parallel circuit structure, the same voltage drops that develop across RP1, RN1, and RN2, also develop across as gate to source voltages across each respective switch 430 through 436, causing switches 430-436 to turn on, i.e., being conductive. In embodiments, the resulting voltage drop between $V_{LOW}$ and $V_{OUT}$ may be determined by an on-state resistance of the two sets of switches, i.e., one set 430-432 located in a first path between to-be-protected voltage node 460 and output voltage node 462 and another set 434-436 located in a second path parallel to the first one, and the respective currents flowing towards output voltage node 462, e.g., to an external load. A person of skill in the art will appreciate that, at a given current level, the voltage drop between to-be-protected voltage node 460 and output voltage node 462 decreases with increasing device size due to decreasing on-state resistance values as a function of device size.

In embodiments, once the voltage that is applied at output voltage node 462 falls outside the range between GND and the supply voltage VCC (plus about 1 Volt that, in practice, may create a dead zone of no circuit activity), the protection feature of circuit 400 may be activated, e.g., by a drain current flowing through switch 410 having a substantially non-zero value and causing a voltage drop on high voltage resistor 414 that is equivalent to the difference between the voltage at output node 462 and the voltage at the source terminal of switch 410.

In embodiments, current mode comparator 406 may compare the drain current flowing through switch 410 to that of current source 450 to generate a control signal (denoted as CP2 in FIG. 4). Similarly, current mode comparator 408 may compare the drain current on switch 412 to that of current source 452 to generate a control signal (denoted as CP1). In embodiments, the state of signals CP1 and CP2 being high is indicative of the voltage at output node 462 exceeding a normal operating voltage range between GND and supply voltage VCC of operational amplifier 402.

In embodiments, bias current control circuit 404 may use control signals CP1 and CP2 to turn off bias currents 470-474. As a result, the voltage drop across high-voltage resistors 414-416 and the gate to source voltages for switches 430-436 will be substantially zero, thus, causing switches 430-436 to turn off, i.e., creating an open circuit, depending of the polarity of the voltage at output voltage node 462.

In embodiments, the back-to-back series-connected body diodes of switches 430-436, due to their opposing polarity, biasing, or direction create a bidirectional high-impedance path between to-be-protected voltage node 460 and output voltage node 462. Advantageously, this protects operational amplifier 402 against unwanted high voltage conditions.

Further, a substantially zero bias current creates a substantially zero voltage drop across, e.g., low-voltage resistor 420, which may act as a floating resistor to provide a convenient way to turn off switch 430. Low-voltage resistors 420-424 may, thus, be viewed as a floating gate control devices.

It is noted that the bidirectional high-voltage protection circuit illustrated in FIG. 4 is not limited to the constructional detail shown there or described in the accompanying text. For example, in embodiments, the functions of switch 410 and high voltage resistor 414 may be implemented using a high-voltage sensing device that may produce an output current that is indicative of the voltage at output node 462 exceeding the supply voltage VCC of operational amplifier 402. As another example, the functions of current mode comparators 406 and 408 may be replaced, e.g., by MOS devices. Similarly, switch 410, high voltage resistor 414, and current mode comparator 406 may be replaced or integrated into any high-voltage circuit that can detect the presence of a voltage above VCC to output, e.g., a corresponding high-level (or low-level) signal that causes the status of control signal CP2 to change from low to high (or vice versa).

In embodiments, the voltage $V_{LOW}$ at to-be-protected voltage node 460 may be determined by the output stage state of operational amplifier 402 and may remain within a range, e.g., from 0 Volt to VCC, whereas the voltage $V_{OUT}$ at output voltage node 462 may vary between −HV and +HV. It is further noted that for proper circuit operation, the magnitude of "HV" should be lower than the breakdown voltage of switches 430-436.

Figure 5:
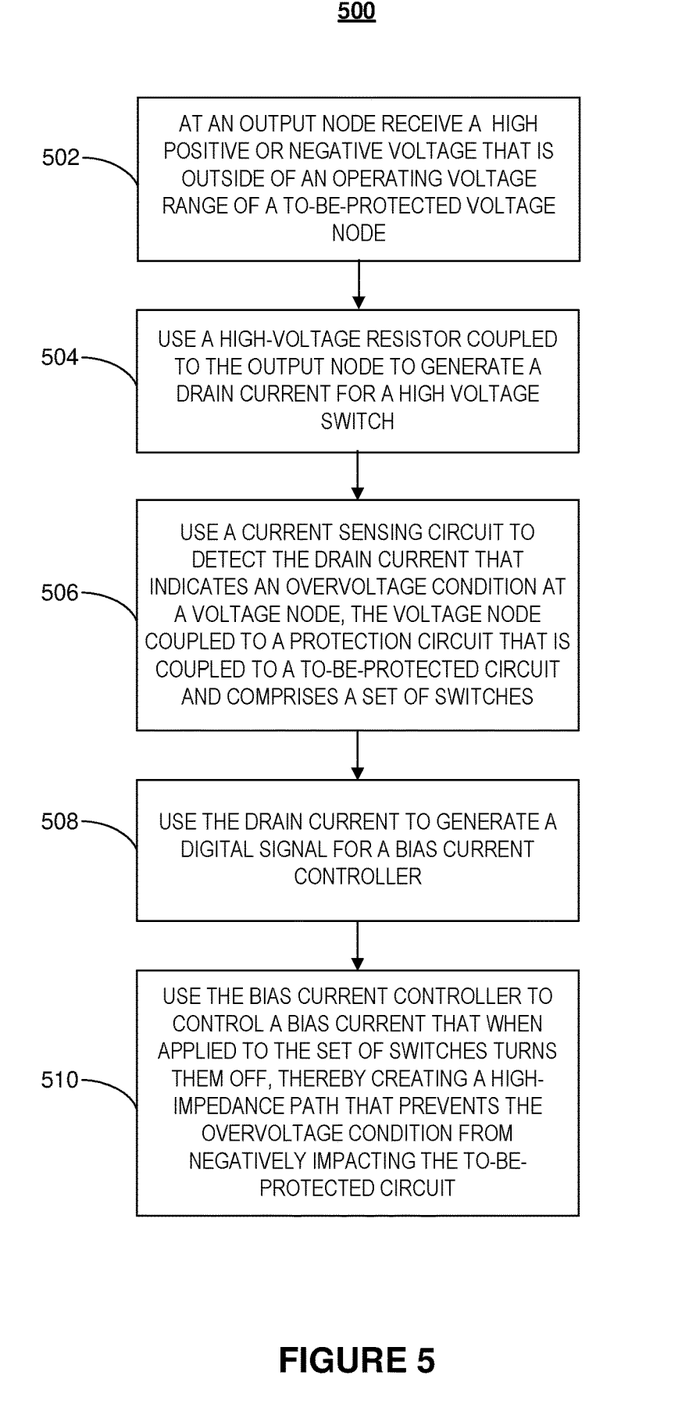
FIG. 5 is a flowchart of a process for protecting a circuit from positive and negative overvoltages according to various embodiments of the present disclosure.

FIG. 5 is a flowchart of a process for protecting a circuit from positive and negative overvoltages according to various embodiments of the present disclosure. In embodiments, process 500 may begin at step 502, when a high positive or negative voltage is received that is outside of an operating voltage range of a to-be-protected voltage node.

At step 504, a high-voltage resistor coupled to the output node may be used to generate a drain current that flows through a high voltage switch coupled to the high-voltage resistor.

At step 506, a current sensing circuit may be used to detect the drain current, which indicates an overvoltage condition at the output node. In embodiments, a protection circuit that comprises a set of switches may be coupled between the output node and the to-be-protected circuit.

At step 508, the drain current may be used to generate a digital signal for a bias current controller.

Finally, at step 510, the bias current controller may be used to control a bias current that when applied to the set of switches turns them off, thereby creating a high-impedance path between the output node and the to-be-protected circuit that prevents the overvoltage condition from negatively impacting the to-be-protected circuit.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An overvoltage protection method comprising:
    using a sensing circuit that, in response to an overvoltage condition being present at a voltage node, detects a current;
    using a current-mode comparator to convert the current to a control signal; and
    using a control circuit that, in response receiving the control signal, turns off a set of switching devices that are coupled to a to-be-protected voltage node to create a high-impedance electrical path between the voltage node and the to-be-protected voltage node.

2. The overvoltage protection method according to claim 1, wherein the overvoltage condition is a high positive or negative voltage outside of an operating voltage range of the to-be-protected voltage node.

3. The overvoltage protection method according to claim 1, wherein the sensing circuit is a current sensing circuit and the control signal is a state signal that controls a set of bias currents.

4. The overvoltage protection method according to claim 1, further comprising using a high-voltage resistor coupled to the voltage node to generate a drain current for a switch.

5. The overvoltage protection method according to claim 4, further comprising using the current sensing circuit to detect the drain current that indicates the overvoltage condition at the voltage node.

6. The overvoltage protection method according to claim 5, further comprising using the drain current as the control signal and using the control circuit as a bias current controller.

7. The overvoltage protection method according to claim 6, wherein the bias current controller applies a bias current to the set of switching devices to turn them off to create the high-impedance electrical path.

8. A dual-polarity high-voltage protection circuit comprising:
    a protection circuit coupled to a to-be-protected voltage node and an output voltage node;
    a voltage sensing circuit that, in response to sensing an overvoltage condition present at the output voltage node, generates an output signal indicative of the overvoltage condition; and
    a control circuit coupled to the voltage sensing circuit, the control circuit, in response to receiving the output signal, causes the protection circuit to assume a high impedance to isolate the to-be-protected voltage node from the overvoltage condition.

9. The circuit according to claim 8, wherein the overvoltage condition is a high positive or negative voltage outside of an operating voltage range of the to-be-protected voltage node.

10. The circuit according to claim 9, wherein the protection circuit comprises two sets of low-voltage switches, each set comprising opposing body diodes.

11. The circuit according to claim 10, wherein the high positive voltage and the high negative voltage each have an amplitude that is lower than a breakdown voltage of a switch in the two sets of low-voltage switches.

12. The circuit according to claim 9, wherein the operating voltage range is controlled by an output stage state of an operational amplifier that is coupled to the to-be-protected voltage node.

13. The circuit according to claim 12, wherein the output stage state of the operational amplifier controls a voltage at the to-be-protected voltage node to be within the operating voltage range.

14. The circuit according to claim 9, wherein the voltage sensing circuit comprises a switch coupled to the output voltage node, the switch generating the output signal in form of a current.

15. The circuit according to claim 14, further comprising a current sensing circuit coupled to the voltage sensing circuit, the current sensing circuit, in response to receiving the current, outputs a state signal that controls a set of bias currents.

16. The circuit according to claim 15, wherein the set of bias currents controls switches in the protection circuit to turn off.

17. The circuit according to claim 16, wherein the current sensing circuit comprises a current-mode comparator coupled to the switch.

18. The circuit according to claim 17, wherein, in response to the voltage sensing circuit not generating the output signal, the current-mode comparator generates a low-level signal to control the set of bias currents in a manner such as to cause the switches to turn on.

19. The circuit according to claim 10, wherein a voltage drop between the to-be-protected voltage node and the output voltage node is determined by on-resistances of the switches and a load current flowing through the output voltage node.

20. A switch network for bidirectional high-voltage protection of a voltage node, the switch network comprising:

two sets of switches that each is coupled to a to-be-protected voltage node and an output voltage node, which in normal operation assumes a voltage within a voltage range;

a set of comparators that each is coupled to a switch in a third set of switches, respectively, and generates a low-level signal to control bias currents to cause the two sets of switches to turn on, such that the voltage drop between the to-be-protected voltage node and the output voltage node is determined by on-resistances of the two sets of switches and a load current flowing through the output voltage node; and in response to the voltage at the output voltage node falling outside the voltage range, a drain current exceeding a current value causing a corresponding comparator in the set of comparators generating a high-level signal that causes the bias currents and, thus, the two sets of switches to turn off, thereby, creating a high-impedance path between the to-be-protected voltage node and the output voltage node, the voltage at the to-be-protected voltage node being controlled by an output stage state of an operational amplifier to be within the voltage range, the voltage at the output voltage node assuming values between a negative high voltage and a positive high voltage.

* * * * *